United States Patent [19]

Wei

[11] Patent Number: 4,940,517

[45] Date of Patent: Jul. 10, 1990

[54] POLYMERIZATION OF ANILINE AND ITS DERIVATIVES

[75] Inventor: Yen Wei, Philadelphia, Pa.

[73] Assignee: Drexel University, Philadelphia, Pa.

[21] Appl. No.: 269,857

[22] Filed: Nov. 10, 1988

[51] Int. Cl.$^5$ ............................................. C25B 3/02
[52] U.S. Cl. .................................. 204/78; 204/59 R; 204/72; 528/422
[58] Field of Search ................... 204/59 R, 72, 78; 252/500; 528/422

[56] References Cited

U.S. PATENT DOCUMENTS

| | | |
|---|---|---|
| 3,975,243 | 8/1976 | Levinos ................................ 204/72 |
| 4,586,792 | 5/1986 | Yang et al. . |
| 4,615,829 | 10/1986 | Tamura et al. . |
| 4,629,540 | 12/1986 | Genieés et al. ................... 204/59 R |
| 4,698,391 | 10/1987 | Yacobucci et al. . |
| 4,699,804 | 10/1987 | Miyata et al. . |
| 4,769,115 | 9/1988 | Satoh et al. ............................ 204/72 |

OTHER PUBLICATIONS

Walter W. Focke et al., "Influence of Oxidation State, pH, and Counterion on the Conductivity of Polyaniline," *J. Phys. Chem.*, 91:5813 (1987).

Akira Kitani et al., "A Conducting Polymer Derived from Para-Aminodiphenylamine," *J. Electroanal. Chem.* 221:69 (1987).

*Primary Examiner*—John F. Niebling
*Assistant Examiner*—Steven P. Marquis
*Attorney, Agent, or Firm*—Panitch Schwarze Jacobs & Nadel

[57] ABSTRACT

Electrically conductive polyaniline and its derivatives are prepared by polymerizing compounds of the Formula:

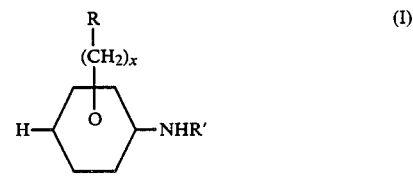

wherein R is —H, —OH, lower alkoxy, halogen, —COOH, —NO$_2$ or —NH$_2$; x is 0 to 4, with substitutions being ortho or meta to the amine group; R' is hydrogen or lower alkyl; comprising reacting the compound of Formula I with an initiator in the presence of a chemical oxidant and/or an applied electrochemical potential, said initiator comprising a substituted or unsubstituted aromatic amine which has a lower oxidation potential than the compound of Formula I, and which is capable of being incorporated into the polymer chain resulting from the polymerization reaction.

18 Claims, 1 Drawing Sheet

POLYMERIZATION OF ANILINE AND ITS DERIVATIVES

FIELD OF THE INVENTION

The present invention relates to the preparation of polyaniline and its ring and/or N-substituted derivatives. More particularly, the invention relates to improved methods for polymerizing aniline and its derivatives in a more cost effective and energy efficient manner, as well as the resulting polyanilines and derivatives having improved properties, such as increased electrical conductivity.

BACKGROUND OF THE INVENTION

Polyaniline is one of the most important electrically conducting polymers and is of great interest for commercial applications on a large industrial scale. Thus, the polymer is moderately electrically conductive upon doping with nonoxidizing Bronsted acids. The conductivity depends on the redox state, the doping level, and the moisture content of the polymer.

Although its electronic conductivity is slightly lower than that of other similar materials, such as polypyrrole and polythiophene, polyaniline has the great advantage that it has a high chemical durability against oxygen and moisture. As a result, polyaniline and its derivatives can be used to construct batteries, electronic materials, coatings and devices, molecular electronic biosensors, anticorrosion materials, electroactive and optical materials, etc.

Polyaniline and its derivatives can be prepared by (i) chemical or (ii) electrochemical oxidation of aniline and its derivatives as represented by the following equation:

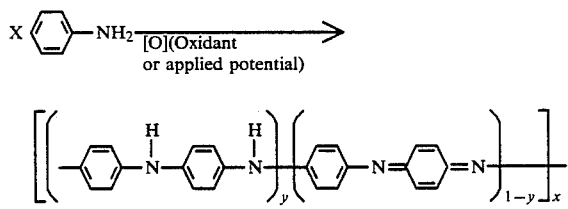

The published literature and patents describe a number of methods for the preparation of polyaniline.

Chemical oxidation of aniline was of great interest to the dye industry in the later 19th and early 20th centuries because of the color of the oxidation product (now called polyaniline). Recently, polyaniline has been rediscovered as an important electrically conducting polymer. Its chemical and electrochemical synthesis have been studied extensively. However, none of the previous methods for the synthesis of electrically conducting polyaniline and its derivatives involves employment of organic initiators as in the present invention.

Chemical synthesis of conducting polyaniline is usually achieved by oxidation of aniline in an acidic aqueous solution (e.g., 1M HCl) using a strong oxidant (e.g., ammonium persulfate $(NH_4)_2S_2O_8$)) at about 0°–5° C. If a very pure (e.g., triply distilled) aniline is used, some inorganic catalyst (e.g., $FeSO_4$) is required to obtain a reasonable rate of the reaction. This catalyst may be an additional source of contamination of the polymer products. A well adopted method for the chemical preparation of conducting polyaniline uses an oxidant aniline molar ratio of about 1:4 and gives a yield of about 10–20%. The conductivity of polyaniline so obtained is about 5–10 S/cm (Siemens/cm=ohm$^{-1}$ cm$^{-1}$). When weak oxidants (e.g., $H_2O_2$) are employed, both the yield and rate of reaction are low, thus limiting the practical commercial applications.

Electrochemical synthesis of conducting polyaniline is generally carried out in an electrolyte consisting of aniline and acid (e.g., 1M HCl) using either potentiostatic or cyclic potential sweep techniques. In order to obtain a reasonable rate of polymerization by both techniques, a high up-limit potential is required, normally 0.8 to 1.2 volts versus saturated calomel electrode (SCE). There are two great disadvantages for the use of the high up-limit potentials. First, more electrical energy is consumed. Second, polyaniline undergoes decomposition at high potentials, and qualities of the polymer decrease.

Accordingly, higher yielding and more effective cost and energy efficient methods of producing polyaniline and its derivatives are needed.

BRIEF SUMMARY OF THE INVENTION

According to the present invention, methods are provided for polymerizing aniline and its derivatives, namely, compounds of Formula I:

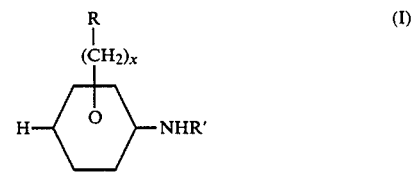

wherein R is —H, —OH, lower alkoxy, halogen, —COOH, —NO$_2$ or —NH$_2$; x is 0 to 4, with substitutions being ortho or meta to the amine group; and R′ is hydrogen or lower alkyl; comprising reacting the compound of Formula I or a water-soluble salt thereof with an organic initiator, in the presence of a chemical oxidant and/or an applied electrochemical potential. The initiator is a substituted or unsubstituted aromatic amine which has a lower oxidation potential than the compound of Formula I and which is capable of being incorporated into the polymer chain resulting from the polymerization reaction.

Preferably, the initiator may be p-aminodiphenylamine, N,N′-diphenylhydrazine, benzidine, p-phenoxyaniline or p-phenylenediamine. Alternatively, the initiator may be a higher oligomer of the compound of Formula I.

DETAILED DESCRIPTION OF THE PREFERRED EMBODIMENTS

Figure 1:
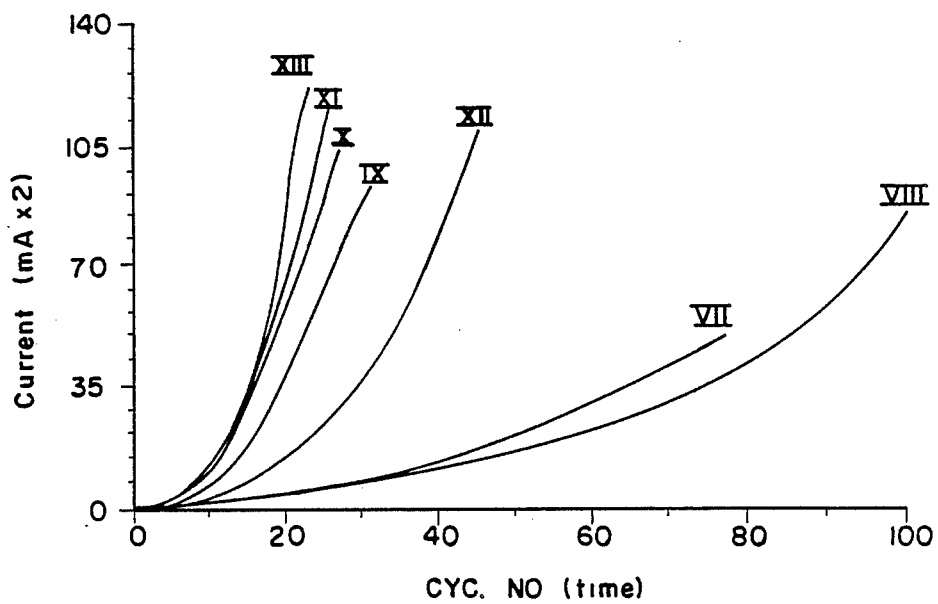
FIG. 1 is a plot of the rate of polyaniline formation with various initiators proportional to anodic current.

The methods of the present invention are applicable to both the chemical and electrochemical synthesis of electrically conducting polyaniline and its derivatives. Generally, the methods may be carried out in essentially the same manner as conventional or other known prior art methods of polymerizing aniline and its derivatives, except that according to the invention, an organic amine initiator is included in the reaction mixture.

As a result of the incorporation of the initiator in the reactions according to the present invention, the rates of polymerization are greatly increased, yields of desired polymer are increased, inorganic contamination and/or structural defects in the polymers are reduced and the purification process is simplified, the choice of oxidants and monomers is broadened, lower potentials are required in the electrochemical synthesis, and qualities of the polymers including electrical conductivities are improved. In general, the methods of the present invention are more cost effective and energy efficient and result in the preparation of higher quality electrically conducting polyaniline and its derivatives.

The methods of the present invention are applicable to the polymerization of compounds (monomers) of the general Formula I:

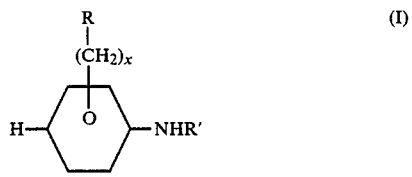

wherein R is —H, —OH, lower ($C_1$–$C_{10}$) alkoxy (preferably —OCH$_3$, —OC$_2$H$_5$), halogen (e.g., —Cl, —F, —Br or —I), —COOH, —NO$_2$ or —NH$_2$; x is 0 to 4 with substitutions being ortho or meta to the amine group; and R' is hydrogen or lower ($C_1$–$C_{10}$) alkyl. Water-soluble salt forms of the monomers of Formula I may also be used in accordance with the present invention. Other similar aniline derivatives which may be polymerized according to the methods of the invention will be apparent to those skilled in the art.

For simplicity of explanation, the following description is primarily in terms of aniline and polyaniline, but it will be understood that the description and methods are applicable to the polymerization of aniline derivatives as well. In addition to aniline, preferred electrically conductive polyaniline derivatives include polymers of the N-substituted compound N-methylaniline (R'=CH$_3$) and the ring-substituted compounds ortho- or meta-toluidine (R=H and x=1) or the corresponding ethyl or methoxy ring-substituted compounds.

The present invention also includes the copolymerization of two or more different monomers of Formula I above, or the copolymerization of monomers of Formula I with one or more other monomers, such as 2,2'- or 4,4'-ethylenedianiline, which may be desired to impart certain properties, such as mechanical strength to the electrically conducting polymers. Aniline or its derivatives may also be copolymerized with other electrically conductive polymers, such as pyrroles, thiophenes, furans and the like, as exemplified in European Published Application No. 85.112972.

Generally, the methods of the present invention, as with the conventional polymerization of polyaniline, are carried out in aqueous medium, preferably an acidic medium or electrolyte containing a dilute inorganic acid, such as hydrochloric or sulfuric acid. In the electrochemical synthesis according to the present invention, a supporting electrolyte may be desired to increase the conductivity of the solution. The supporting electrolytes preferably include the inorganic (e.g., Li$^+$, Na$^+$, K$^+$, NH$_4^+$) and organic (e.g., tetra-n-butyl ammonium, tetraethylammonium) salts of Cl$^-$, SO$_4^=$, NO$_3^-$, ClO$_4^-$, BF$_4^-$, and PF$_6^-$, for example. Other suitable electrolytes are known in the art and may be substituted as desired. Various concentrations of acid may be used according to the invention, but a dilute acid such as a 1M solution, is preferred.

According to another embodiment of the present invention, the acidic medium or electrolyte may contain a polymeric acid, such as polysulfonic or acrylic acid, in order to dope the polyaniline polymer to improve its mechanical properties.

In the case of polymerization of aniline by chemical oxidation, the methods of the invention may use any of a number of conventional or unconventional oxidizing agents. With prior art methods, a strong oxidizing agent, such as ammonium persulfate, was usually preferred to obtain a reasonable rate of polymerization and yield level. Milder oxidants, such as hydrogen peroxide, gave low yields and were generally not commercially practical. However, according to the present invention, mild and even weak oxidants, such as oxygen gas may be used as the chemical oxidizing agent to produce reasonable yields of polymer at a reasonable polymerization rate.

Examples of suitable oxidizing agents include the salts of $S_2O_8^=$, $Cr_2O_7^=$, chlorate, vanadate, ferricyanide with Na$^+$, K$^+$, or NH$_4^+$ as counter ions, H$_2$O$_2$, and O$_2$. Preferably, the oxidizing agent comprises (NH$_4$)$_2$S$_2$O$_8$. Other suitable oxidizing agents, in addition to those exemplified above, will be apparent in view of the present disclosure. The ratio of oxidizing agent to monomer is preferably in the range of about 0.1:1 to about 2:1 with the range of about 1:1 to about 1.25:1 (in the case of ammonium persulfate) being more preferred. Generally if the ratio is too low, the yield is poor; if too high, polymer decomposition occurs.

As with prior art methods, chemical polymerization of aniline is preferably carried out at atmospheric pressure. The temperature range of the chemical polymerization is very broad and not particularly critical, depending on the solvents used, as long as it does not exceed the boiling point or fall below the melting point of the solvents. In aqueous solutions, a preferable range is about 0° to about 60° C. with temperatures below room temperature (e.g., about 0° to about 5° C.) being more preferred. It will be apparent to one skilled in the art, however, that with some organic solvents, the temperature could be lower. Generally, the higher the temperature, the greater the rate of reaction, including undesirable side reactions.

Examples of solvents suitable for chemical polymerization according to the present invention include water, organic solvents miscible with water, such as ketones (e.g., acetone), ethers (e.g., tetrahydrofuran), nitriles (e.g., acetonitrile), organic protonic acids, (e.g., acetic acid or trifluoroacetic acid), organic solvents not miscible with water (e.g., carbon tetrachloride and hydrocarbons), and mixtures thereof. The solvents must be ones which will not be oxidized in the reaction.

Additional protonic acids, which may be used in accordance with the present invention include inorganic acids, such as HCl, H$_2$SO$_4$, HNO$_3$, HClO$_4$, HBF$_4$, HPF$_6$, and organic acids, such as alkyl or aryl sulfonic acids, trifluoroacetic acid, and polymeric acids. The presently preferred acids include HCl, H$_2$SO$_4$, sulfonic acids and trifluoroacetic acid. The concentration of acid depends on the final pH of the solution (containing the monomer, oxidizing agent, solvent, and acid), which should be acidic (i.e., pH<7); and a pH range of −1 to 2 is preferable for inorganic acids in aqueous media.

While inorganic catalysts may be employed in the chemical polymerization, if desired, their use is generally undesirable due to the previously mentioned contamination of the polymer products. Moreover, such catalysts are generally unnecessary with the methods of the present invention.

In the case of electrochemical polymerization of aniline, the electric potential is generally applied using either potentiostatic or cyclic potential sweep techniques. Generally, a platinum electrode is used for plating out the polyaniline, and the potential is applied against a saturated calomel electrode (SCE). However, other suitable electrolytic methods and apparatus for carrying out the present invention will be evident to those skilled in the art.

A particular advantage of the methods of the present invention is that the up-limit potentials required in prior art methods are significantly reduced. For example, whereas prior art methods normally required an up-limit potential of about 0.8 to 1.2 volts versus SCE, up-limit potentials in the range of about 0.55 to 0.75 volts versus SCE have been found to be satisfactory according to the present invention.

With both the chemical and electrochemical oxidation methods according to the present invention, the advantages of the invention are obtained by the use of an organic amine initiator to initiate the polymerization of aniline or its derivatives. The initiators useful in the present invention must have two properties: (i) they must have lower oxidation potentials than the aniline monomer or other aniline derivatives to be polymerized; and (ii) they must be capable of being incorporated into the polymer chain (i.e., as an integral part of the structural backbone) of the polymer resulting from the polymerization reaction. As a result, the polymer products will not be contaminated by extraneous moieties, as was the case with the inorganic catalysts often used in the prior art.

Preferably, the initiators useful in the present invention are of Formula II:

(II)

wherein n is 0 to 7; R" is —H, —NH₂, —OR, —OH, —SR or —C₆H₄NH₂, provided that when n is 0, R" is not —H—; X is —NR'''—, —O— or —S—; and R''' is —H or lower alkyl. In addition, precursors or the fully or partially oxidized forms of Formula II or the salts of any of these may be used as an organic initiator, such as the oxidized p-aminodiphenylamine:

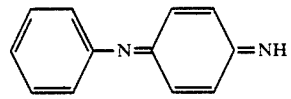

or partially oxidized tetramer aniline:

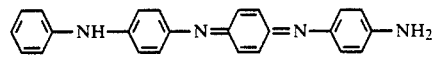

Particularly preferred organic amine initiators for use in the present invention include the dimeric species and other higher oligomers of aniline (or its derivatives) resulting from radical coupling among various resonance forms of the aniline radical cation. The most common (and relatively inexpensive, commercially available) dimeric form of aniline is p-aminodiphenylamine, which results from normal head-to-tail coupling of the aniline radical. Other dimeric species which may be used include N,N'-diphenylhydrazine (also referred to as 1,2-diphenylhydrazine), which results from head-to-head coupling of the aniline radical, and benzidine, which results from tail-to-tail coupling of the aniline radical. Note that N,N'-diphenylhydrazine does not fit Formula II, but it is a precursor in that in the presence of strong acids during polymerization, N,N'-diphenylhydrazine undergoes a rearrangement reaction to yield benzidine which is believed to be the real initiator species.

Other suitable organic amine initiators useful in the present invention include p-phenoxyaniline, p-phenylenediamine, and higher oligomers of aniline and its derivatives. Other suitable organic amines meeting the above criteria will be apparent to those skilled in the art.

While applicant does not wish to be bound by any particular theory, the following mechanism is believed to account for the polymerization of aniline in the presence of initiators (e.g. p-aminodiphenylamine):

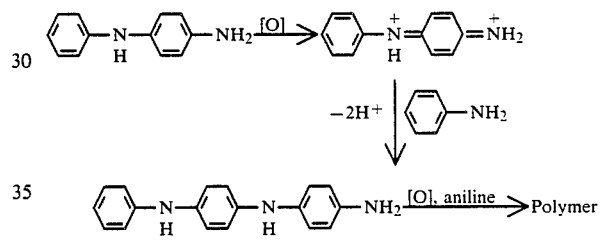

Because the initiator and successive higher oligomers in the polymerization reaction all have lower oxidation potentials than aniline, the rate of polymerization increases leading to a higher yield and fewer structural defects in the polymer. Also, as noted above, lower applied potentials or milder oxidants can be effectively employed.

According to conventional polymerization techniques, polyaniline generally has a molecular weight (by GPC) of greater than about 2,000 (a degree of polymerization greater than about 20), and generally a molecular weight of about 5,000 to 200,000. Polymers in the same general range may be produced according to the present invention, but the invention has the potential to control the molecular weight of the polymer. Thus, whereas prior art methods without the presence of an initiator produce random polymerization with a range of high and low molecular weight chains, the use of initiators according to the present invention may yield polymer chains of relatively uniform molecular weight.

The concentration of initiator to be used according to the present invention should be about 0.01 to about 10 molar percent based upon the monomer to be polymerized, and preferably about 0.1 to about 2 molar percent. Lower amounts of initiator generally give lower rates of polymerization and higher amounts of initiator generally give higher rates of polymerization. However, if the amount of initiator is too high, many undesirable side reactions would occur, resulting in poor quality polymers. For example, both electrochemical and chemical polymerization of p-aminodiphenylamine (without aniline) yield polymers with very low molecular weights whose electrochemical behaviors (such as the cyclic voltammogram) are strikingly different from those of polyaniline and whose conductivity is very low (the highest value is about $8 \times 10^{-3}$ S/cm upon doping with HCl, (see Akira Kitani, et al., "A Conducting Polymer Derived From Para-Aminodiphenylamine," *J. Electroanal. Chem.* 221:69 (1987)).

As with polyanilines produced according to the prior art techniques, the polymers produced according to the present invention exhibit good environmental stabilities but generally poor mechanical properties. However, the electrical conductivities are significantly improved, often being on the order of twice as conductive as similar polyanilines of the prior art. In the case of electrochemical polymerization, the polyaniline films coated on the platinum electrode are considerably improved in appearance and uniformity compared to prior art films. Other film-forming techniques used in the prior art may also be used with the methods of the present invention.

Perhaps most importantly, the methods of the present invention result in considerably increased polymerization rates and polymer yields. Thus, polymerization rates have been increased by as much as twenty times or more, and polymer yields of 80 percent or more are possible according to the present invention.

The invention will now be illustrated in more detail with reference to the following specific, non-limiting examples:

Chemical Synthesis of Polyaniline

EXAMPLE I

An aqueous solution of 10 g (0.11 mole) aniline and 0.1 g ($5 \times 10^{-4}$ mole) p-aminodiphenylamine (initiator, predissolved in 5 ml of acetonitrile) in 500 ml of 1M HCl was cooled to 0°–5° C. in an ice-water bath. A pre-cooled solution of 28.5 g (0.13 mole) ammonium persulfate in 300 ml of 1M HCl was added dropwise with stirring to the aniline solution. The resulting solution showed a blue color instantaneously and green precipitate formed in less than 2 minutes after the reactants were mixed. After about 1 hour, the precipitate was collected, washed with 1M HCl, and dried under dynamic vacuum at 60° C. for 48 hours. The polyaniline hydrochloride salt (10.6 g, 87% yield) so prepared had an electrical conductivity of about 20 S/cm measured as a pellet using standard 4-probe techniques.

The conductivity of polyaniline is known to be affected by its moisture content. Tests were run to show the relation of (a) weight gains and (b) the conductivities with the exposure to the laboratory atmosphere of the polymers prepared as above and prepared by the conventional method (as above but without initiator). The weight gains for the polyaniline prepared by the conventional method and by the new method were essentially identical, but the conductivities of the polyaniline by the new method are significantly higher (about 20 S/cm vs. about 12 S/cm).

EXAMPLES IA and IB

Example I was repeated except that o-toluidine (IA) or m-toluidine (IB) was used as the monomer. The conductivities of poly(o-toluidine) and poly(m-toluidine) were about 0.2 to 1 and about 0.1 to 0.5 S/cm, respectively; while without the initiator they were about 0.067 to 0.13 and 0.012 to 0.056 S/cm, respectively.

EXAMPLE II

Example I was repeated except that hydrogen peroxide was used as the oxidant at a concentration 0.6 mole percent based on the initial aniline concentration. Similar results as in Example I were obtained. The conductivity of the polyaniline so prepared was about 2–4 S/cm while the polymer obtained without the initiator was about 0.1–1 S/cm. Since the polymerization is an exothermic reaction, even a small amount of the initiator can increase the rate of polymerization as indicated by the peak temperature (about 37°–38° C.) appearing earlier.

Electrochemical Synthesis of Polyaniline

EXAMPLE III

Polyaniline film was prepared on a platinum electrode by cycling the potential between $-0.2$ and 0.6 volts at a sweep rate of 50 mV/sec vs. SCE at room temperature. The electrolyte consisted of an aqueous solution of 0.11M aniline and $6.6 \times 10^{-4}$M p-aminodiphenylamine (initiator) in 1.0M HCl. The amount of polyaniline formed on the electrode was monitored by measuring the change in the anodic peak current at about 0.17V vs. SCE with the reaction time. The amount of the polymer formed was found to be directly proportional to the anodic peak current. The rate of polymer formation in the presence of the initiator was about 20 times higher than that in the absence of the initiator under the identical experimental conditions.

EXAMPLES IIIA–IIIB

Poly(o-toluidine) and poly(m-toluidine) were prepared following the same procedure as described in Example III except: (a) o-toluidine (IIIA) and m-toluidine (IIIB) were used as monomers at a concentration 0.20M; (b) the concentration of p-aminodiphenylamine (initiator) was $4.3 \times 10^{-3}$M; and (c) the potentials were cycled between $-0.2$ and 0.8V vs. SCE at a sweep rate of 25 mV/s. The initiator improves the rates of polymer formation by a factor of 5 to 20.

EXAMPLES IV–VI

Example III was repeated using the same reaction conditions except the up-limit potentials were cycled between (IV) $-0.2$ and $-0.8$V, (V) $-0.2$ and 0.7V, and (VI) $-0.2$ and 0.55V. In all cases, the initiator greatly improved the rates of polymer formation. With the up-limit potential at 0.55V vs. SCE, in the presence of the initiator the polymer was produced effectively but no noticeable polymerization was observed in the absence of the initiator.

EXAMPLES VII–XIII

Effects of various initiators on the rate of polyaniline formation were demonstrated using the procedure of Example V and the following reaction conditions: electrolyte: 0.11M aniline and $8 \times 10^{-4}$M initiator in 1M HCl; cycling potential range: $-0.2$ to 0.75V vs. SCE; sweep rate: 50 mV/sec. The initiators were: (VII) no initiator added; (VIII) hydroquinone, a noninitiator; (IX) p-aminodiphenylamine; (X) N,N'-diphenylhydrazine; (XI) benzidine; (XII) p-phenoxyaniline; (XIII) p-phenylenediamine. The amounts of polyaniline formed (directly proportional to anodic current) are shown in FIG. 1 for each example. One interesting observation is that although hydroquinone (VIII) has a lower oxidation potential than aniline, it does not facilitate the formation of polyaniline. Since hydroquinone cannot be incorporated into the polymer backbone, it is, therefore, not an initiator.

The present invention may be embodied in other specific forms without departing from the spirit or the essential attributes thereof and, accordingly, reference should be made to the appended claims, rather than to the foregoing specification as indicating the scope of the invention.

What is claimed is:

1. A method for polymerizing compounds of Formula I:

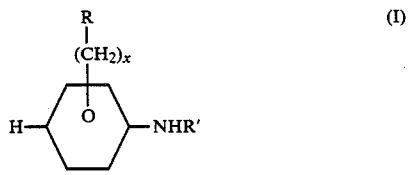

wherein R is —H, —OH, lower alkoxy, halogen, —COOH, —NO$_2$ or —NH$_2$; x is 0 to 4, with substitutions being ortho or meta to the amine group; R' is hydrogen or lower alkyl; comprising reacting the compound of Formula I or a water-soluble salt thereof with an initiator, in the presence of a chemical oxidant and/or an applied electrochemical potential, said initiator comprising a substituted or unsubstituted aromatic amine which has a lower oxidation potential than the compound of Formula I and which is capable of being incorporated into the polymer chain resulting from the polymerization reaction.

2. A method according to claim 1, wherein said initiator is of the Formula II:

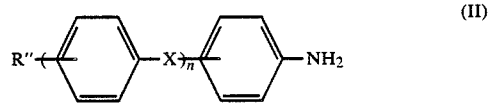

wherein n is 0 to 7; R" is —H, —NH$_2$, —OR, —OH, —SR or —C$_6$H$_4$NH$_2$, provided that when n is 0, R" is not —H; X is —NR'"—, —O—, or —S—; and R'" is —H or alkyl.

3. A method according to claim 1 wherein said initiator is selected from the group consisting of p-aminodiphenylamine, N,N'-diphenylhydrazine, benzidine, p-phenoxyaniline, p-phenylenediamine and partially oxidized tetramer aniline.

4. A method according to claim 1 wherein said initiator is an oligomer of the compound of Formula I.

5. A method according to claim 4 wherein said initiator is a dimer of the compound of Formula I.

6. A method according to claim 1 wherein R' is —H or methyl and x is 0.

7. A method according to claim 1 wherein x is 1 or 2 and R is hydrogen.

8. A method according to claim 1 wherein said oxidant is selected from the group consisting of $S_2O_8^=$, $Cr_2O_7^=$, chlorate, vanadate, ferri-cyanide, hydrogen peroxide and oxygen gas.

9. A method according to claim 1 wherein said reaction is carried out in an electrolyte.

10. A method according to claim 9 wherein said electrolyte is selected from the group consisting of dilute solutions of hydrochloric acid, sulfuric acid, HNO$_3$, HClO$_4$ and the Li$^+$, Na$^+$, K$^+$ or NH$_4^+$ salts of Cl$^-$, SO$_4^=$, NO$_3^-$, ClO$_4^-$, BF$_4^-$ or PF$_6^-$.

11. A method according to claim 1 wherein said electrochemical potential is applied by a potentiostatic.

12. A method according to claim 1 wherein said electrochemical potential is applied by a cyclic potential sweep technique.

13. A method according to claim 1 wherein said reaction is initiated at a temperature below about 5° C.

14. A method according to claim 1 wherein the applied electrochemical potential results in the polymer plating out as a film on a platinum electrode.

15. A method according to claim 1 wherein the reaction includes more than one compound of Formula I to produce a copolymer.

16. A method according to claim 1 wherein the reaction includes another monomer besides a monomer of Formula I to produce a copolymer.

17. In a method of preparing polyaniline comprising reacting aniline in an acidic aqueous solution with a chemical oxidizing agent, the improvement comprising adding to the solution a substituted or unsubstituted aromatic amine initiator which has a lower oxidation potential than aniline and is capable of being incorporated into the polyaniline chain.

18. In a method of preparing polyaniline electrochemically comprising reacting aniline in an aqueous electrolyte solution by applying an electrochemical potential between a platinum electrode and a saturated calomel electrode in said solution, and plating the polyaniline on the platinum electrode, the improvement comprising adding to the solution a substituted or unsubstituted aromatic amine initiator which has a lower oxidation potential than aniline and is capable of being incorporated into the polyaniline chain.

* * * * *